US006618524B2

(12) United States Patent
Lee et al.

(10) Patent No.: US 6,618,524 B2
(45) Date of Patent: Sep. 9, 2003

(54) TUNABLE FABRY-PEROT FILTER AND METHOD FOR FABRICATING THE SAME

(75) Inventors: Myung-Hyun Lee, Taejon (KR); Yoo Hong Min, Taejon (KR); Jung Jin Ju, Taejon (KR); Seung Koo Park, Taejon (KR); Jung Yun Do, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/851,145

(22) Filed: May 9, 2001

(65) Prior Publication Data

US 2002/0085810 A1 Jul. 4, 2002

(30) Foreign Application Priority Data

Dec. 30, 2000 (KR) ........................................ 2000-86746

(51) Int. Cl.[7] ................................................. G02B 6/26
(52) U.S. Cl. ................................. 385/39; 385/8; 385/40
(58) Field of Search ........................... 385/8, 9, 12, 39, 385/40, 129, 130, 131

(56) References Cited

U.S. PATENT DOCUMENTS

| 4,400,058 A |   | 8/1983  | Durand et al. |
|---|---|---|---|
| 4,553,816 A |   | 11/1985 | Durand et al. |
| 5,185,842 A | * | 2/1993  | Hakogi ........................ 385/129 |
| 5,208,886 A |   | 5/1993  | Clayton et al. |
| 5,434,943 A |   | 7/1995  | Dentai et al. |
| 6,154,591 A | * | 11/2000 | Kershaw ....................... 385/39 |
| 6,241,397 B1 | * | 6/2001  | Bao et al. ...................... 385/73 |
| 6,445,838 B1 | * | 9/2002  | Caracci et al. ................. 385/14 |

OTHER PUBLICATIONS

Pigtailed High–Finesse Tunable Fibre Fabry–Perot Interferometers with Large, Medium and Small Free Spectral Ranges; 1987 Electronics Letters, vol. 23, pp. 781–783.

Sneh, et al.; High–Speed Wavelength Tunable Liquid Crystal Filter; IEEE Photonics Technology Letters, vol. 7, No. 4, Apr. 1995; pp. 379–381.

Bao, et al.; High–Speed Liquid Crystal Fiber Fabry–Perot Tunable Filter; IEEE Photonics Technology Letters, vol. 8, No. 9, Sep. 1996; pp. 1190–1192.

Liu, et al.; Analog Smectic C* Ferroelectric Liquid Crystal Fabry–Perot Optical Tunable Filter; IEEE Photonics Technology Letters, vol. 7, No. 11, Nov. 1995.

Iodice, et al.; Silicon Fabry–Perot Filter for WDM Systems Channels Monitoring; Optics Communications 183 (2000) pp. 415–418; Sep. 15, 2000.

* cited by examiner

Primary Examiner—Robert H. Kim
Assistant Examiner—Therese Barber
(74) Attorney, Agent, or Firm—Jacobson Holman PLLC

(57) ABSTRACT

A tunable Fabry-Perot filter is provided with two optical fibers each being coated with a high-reflective thin film at its one end, a silicon block for aligning the two optical fibers with each other having a pair of V-shaped grooves formed at both ends thereof, respectively, a resonant cavity medium of silicon or polymeric material having a high coefficient of thermo-optic effect, and a thermal electrode for applying heat to the resonant cavity medium.

7 Claims, 6 Drawing Sheets

TUNABLE FABRY-PEROT FILTER AND METHOD FOR FABRICATING THE SAME

FIELD OF THE INVENTION

The present invention relates to an optical filter of the optical devices used in an optical communication, more particularly, to a tunable Fabry-Perot filter and a method for fabricating the same.

DESCRIPTION OF THE PRIOR ARTS

Technology of making an optical filter, particularly, technology on a tunable optical filter, is related to tunable Fabry-Perot filters, a micro machined device, a Mach-Zehnder interferometer, a fiber bragg grating, acousto-optic tunable filters, electro-optic tunable filters, an arrayed waveguide grating (AWG), an active filter, and ring resonator tunable filters. Description on such tunable filter is well given in pages 50–55 of the IEEE Communication Magazine issued on December, 1998, by D. Sadot and E. Boimovich, and entitled "Tunable Optical Filters for Dense WDM Networks".

The technologies of the tunable Fabry-Perot filters are largely classified into two kinds. First thing is a method for adjusting optical thickness of a cavity medium between optical fibers each having a high-reflective cross-section by using a piezo-electric technology (see pages 781–783 of Electronics Letters, Vol. 23, issued in 1987 by J. Stone and L. W. Stulz and entitled "Pigtailed high finess tunable fiber Fabry-Perot interferometer with large, medium, and small free spectral range"). The other is a technology of tunably filtering by deriving a variation of refractive index due to a change of polarized light characteristics when an electric field is applied, using Ferroelectric Liquid Crystal as a medium between optical fibers each having a high-reflective cross-section (see pages 379–381 of IEEE Photonics Technology Letters, Vol. 7, No. 4, issued in 1995 by A. Sneh and K. M. Johnson and entitled "High-speed wavelength tunable liquid crystal filter").

However, the method using piezo-electric technology for adjusting the thickness of the medium makes it difficult to align the optical fibers with each other and has many difficulties in a manufacturing process, since it is configured to use ferrule and a sleeve in aligning the optical fibers.

The technology using Ferroelectric Liquid Crystal as a medium also has many difficulties in aligning and manufacturing processes, because an improvement of the filtering speed is obtained through changing the alignment of the liquid crystal by applying the electric field thereto.

SUMMARY OF THE INVENTION

It is, therefore, a primary object of the invention to provide a tunable Fabry-Perot filter having a broad free spectral range (FSR), good finess, narrow 3-dB peak bandwidth or narrow full width at half-maximum, and a widened tuning range by using a thermo-optic effect of silicon and polymeric material, being easy to manufacture and to align optical fibers, and capable of being used for dense wavelength division multiplexing (WDM).

In order to achieve the object, the present invention provides a tunable Fabry-Perot filter including V-shaped grooves for aligning optical fibers each having a high-reflective cross-section, a thin-film medium having a resonant cavity of a high thermo-optic coefficient, and a thermal electrode formed on or between the thin-film medium.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

The present invention allows an easy manufacture of the tunable Fabry-Perot filter with a reduced cost. The present invention makes it easy to align optical fibers with a thin-film medium having a resonant cavity and to align the thin-film medium with other optical fibers by using a V-shaped groove instead of the conventional optical fiber ferrule. Further, silicon or polymeric material of lower price is used as the thin-film medium having the resonant cavity. By using the silicon or polymeric material, a widened or broad tuning range is easily obtained by using a high thermo-optic coefficient. Further, undesirable problem of dependency on a polarized light occurring in most polymer thin-films can be solved by inserting a polymer segment between the optical fibers having the high-reflective cross-section.

In the present invention, the V-shaped groove is formed using the technology of fabricating a V-groove well known and developed in a silicon-device integrating technology. Preparing the optical fiber having the high-reflective cross-section is performed in such a manner that a plurality of thin-film dielectric are coated into a laminated form. The resonant cavity made of the silicon is made using the space between two V-shaped grooves. That is, the resonant cavity of the thin-film made of the polymeric material can be made using normal spin coating and lithography technology between two V-shaped grooves. Further, it can be made in such a manner that multi-layered polymer thin films are first formed on a substrate by using the spin coating and then are separated from the substrate. A thermal electrode is formed on a portion of the cavity medium by using a metal deposition and an electroplating. In a case of the polymeric material, the metal deposition and the electroplating are used during forming the multi-layered polymer thin-films or after the formation of the multi-layered polymer thin-films. Final process for fabricating the tunable Fabry-Perot filter is to align the optical fibers having the high-reflective cross-section with the V-shaped grooves having the silicon cavity medium or is to align the optical fibers having the high-reflective cross-section with the V-shaped grooves having the polymer cavity medium.

Free spectral range (FSR) and finess of the characteristics of the filter are dependent on length l of the resonant cavity medium and high-reflection factor HR, respectively. However, tuning range is dependent on the thermo-optic coefficient. In the present invention, the wavelength tuning is achieved by using the thermo-optic effect of the silicon or polymeric material. The free spectral range (FSR) dependent on the length l of the resonant cavity medium, i.e., the length of the thin film ranges from 1 nm to 80 nm, the finess ranging from 100 to 200, while 3-dB peak bandwidth or full width at half-maximum is about 0.1 nm.

Figure 1A:
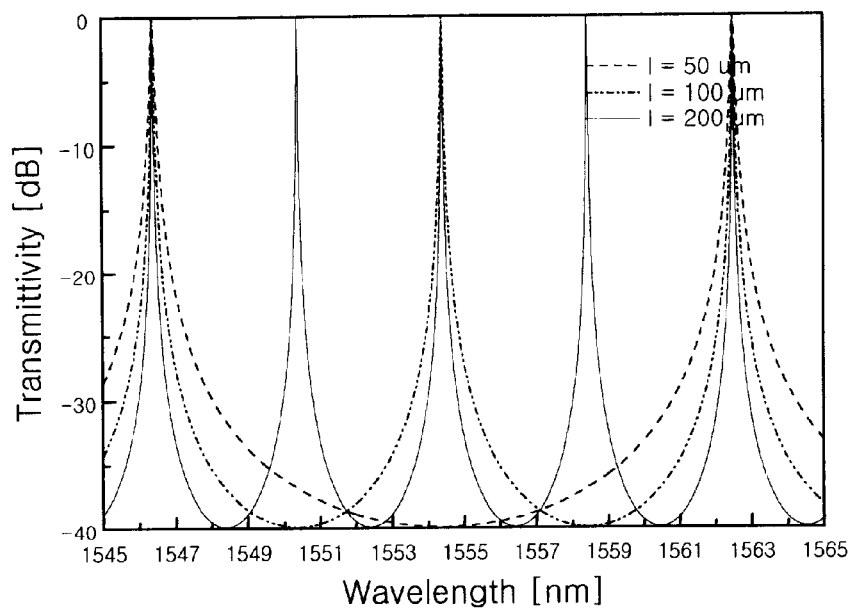
FIG. 1A illustrates a graph showing a relationship between FRS and a length of a resonant cavity medium.
Figure 1B:
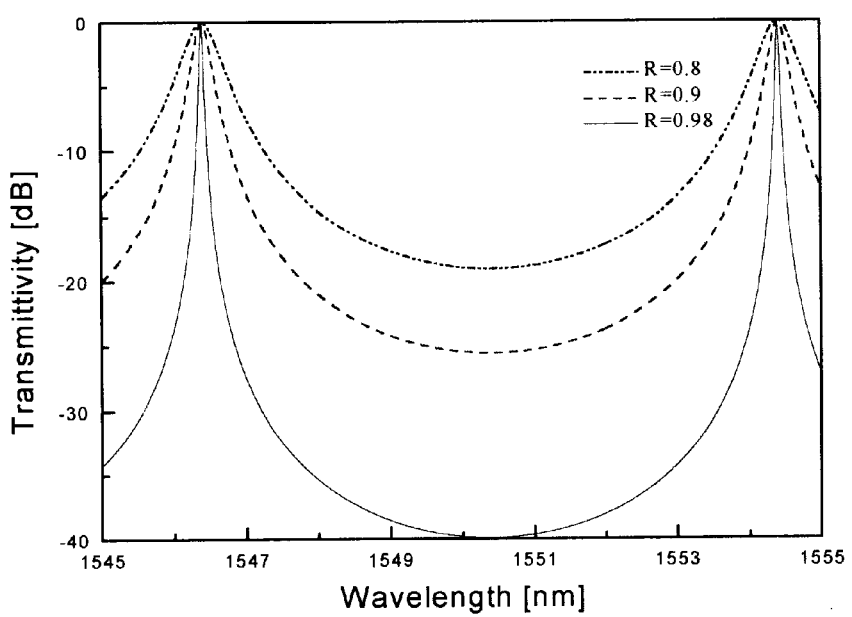
FIG. 1B illustrates a graph showing a relationship between Finess and HR.
Figure 1C:
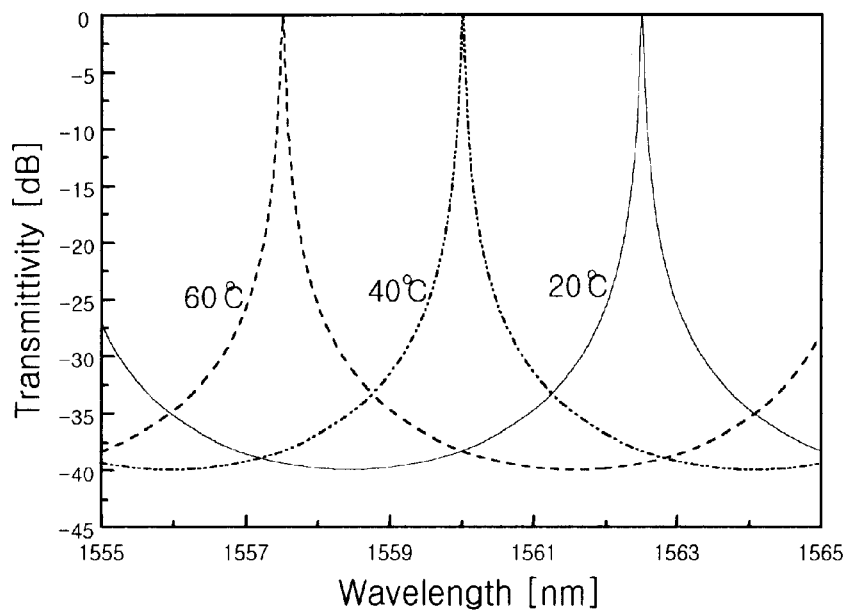
FIGS. 1C and 1D represent temperature-wavelength tuning range diagrams for polymeric material and silicon, respectively.
Figure 1D:
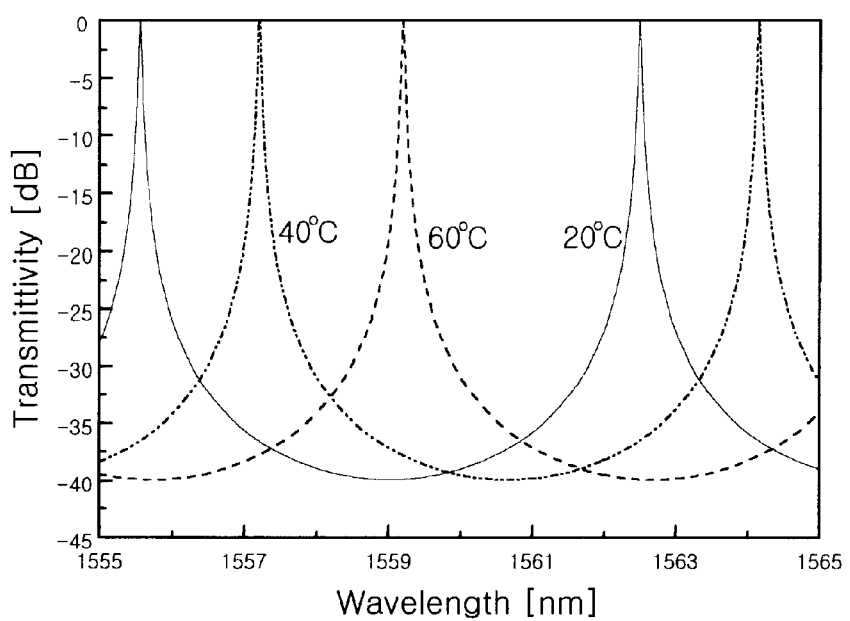

FIG. 1A shows a variation of the FSR as a function of the length of the resonant cavity medium wherein refractive index n of the resonant cavity medium is 1.50, high reflection factor HR being 0.98, while the lengths l are 50 m, 100 m, and 200 m, respectively. Accordingly, if the length l of the resonant cavity medium is reduced, the FSR is increased. This can be used in a WDM optical communication network of abroad wavelength range. FIG. 1B shows a variation of the finess as a function of the high reflection factor HR of the resonant cavity medium wherein refractive index n is 1.50, the length l is 100 m, while the high reflection factors HR are 0.8, 0.9 and 0.98, respectively. Accordingly, if the high reflection factor HR is equal to or above 0.98, a dense WDM having a channel separation of 0.8 nm or 0.4 nm can be embodied. FIG. 1C represents temperature-wavelength change diagram for the polymeric material, wherein the refractive index n and the coefficient of the thermo-optic effect dn/dT of the polymeric material are 1.50 and $-1.2 \times 10^{-4}$, respectively, while HR=0.98, and l=100 m, at temperatures of 20 C., 40 C., 60 C., respectively. FIG. 1D shows temperature-wavelength change diagram for the silicon, wherein the refractive index n and the coefficient of the thermo-optic effect dn/dT of the silicon are 3.50 and $1.85 \times 10^{-4}$, respectively, while HR=0.98, and l=25 mm, at temperatures of 20 C., 40 C., 60 C., respectively. As shown in FIGS. 1C and 1D, since the high coefficient of the thermo-optic effect of the silicon and the polymeric material is used, higher tuning effect of the wavelength equal to or above 10 nm can be obtained at temperature change of 100 C. Further, if the temperature is increased, the wavelength tuning range can be adjusted to be biased toward the short wavelength in the case of the polymeric material and to be biased toward the long wavelength in the case of the silicon.

Preferred embodiments of the present invention are described with reference to accompanying drawings.

Embodiment 1

Figure 2:
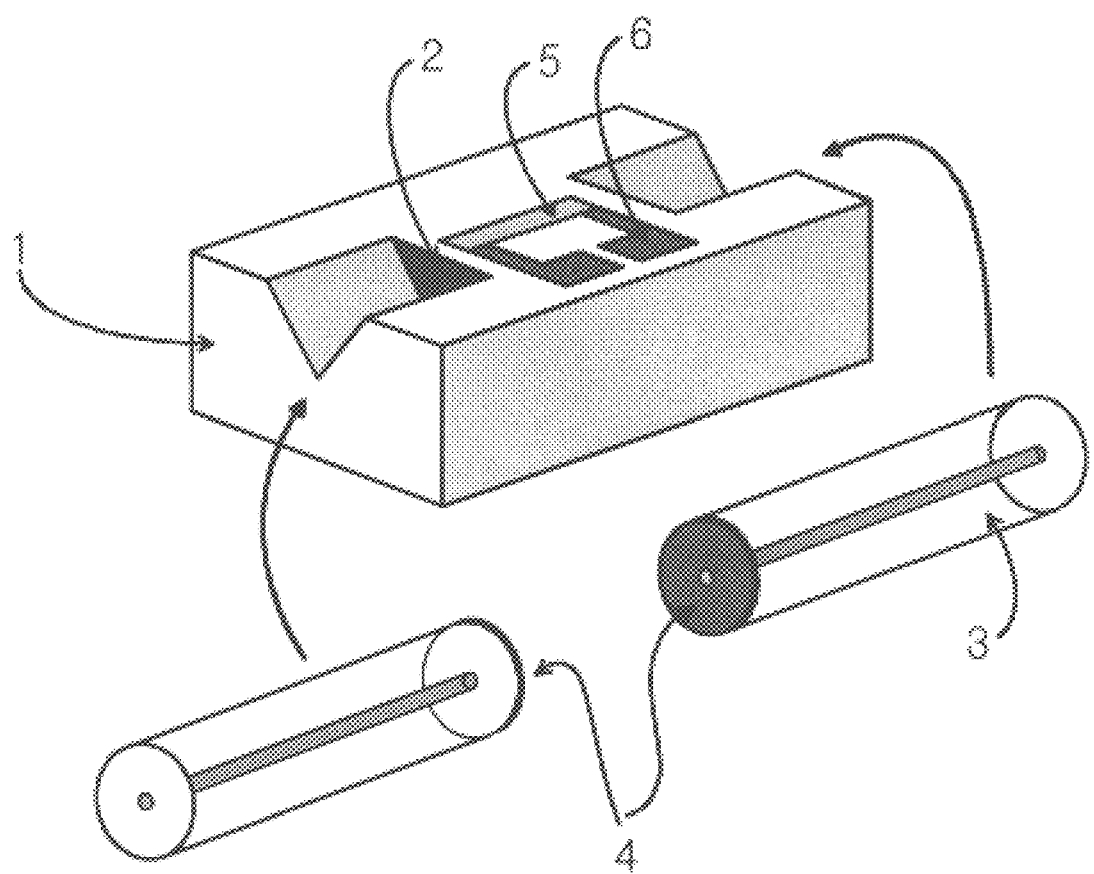
FIG. 2 gives a perspective view of a tunable Fabry-Perot using the thermo-optic effect of silicon in accordance with a first embodiment of the present invention.

In FIG. 2, there is shown a perspective view of a tunable Fabry-Perot using the thermo-optic effect of silicon in accordance with a first embodiment of the present invention.

As shown in FIG. 2, a pair of V-shaped grooves are formed at both ends of a silicon block 1. Two optical fibers 3 each being coated with a high-reflective thin film 4 at an end thereof are deposited and aligned on the V-shaped grooves, respectively, in such a manner that the high-reflective thin films 4 face each other. The silicon between the both V-shaped grooves becomes a thin-film resonant cavity medium 2. A thermal electrode will be formed on the thin-film resonant cavity medium 2, which includes a thin film gold-coated electrode 6 for supplying electric power to the thermal electrode and a thick film pad 5 formed through the electroplating.

Embodiment 2

Figure 3:
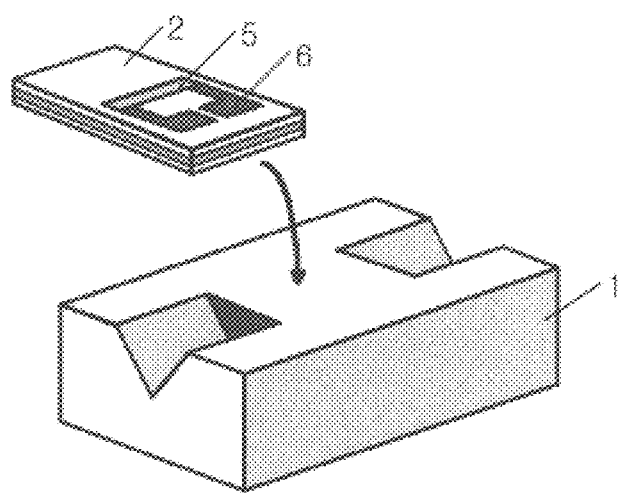
FIG. 3 depicts a perspective view and a top planar view of a tunable Fabry-Perot using the thermo-optic effect of polymeric material in accordance with a second embodiment of the present invention.
Figure 3:
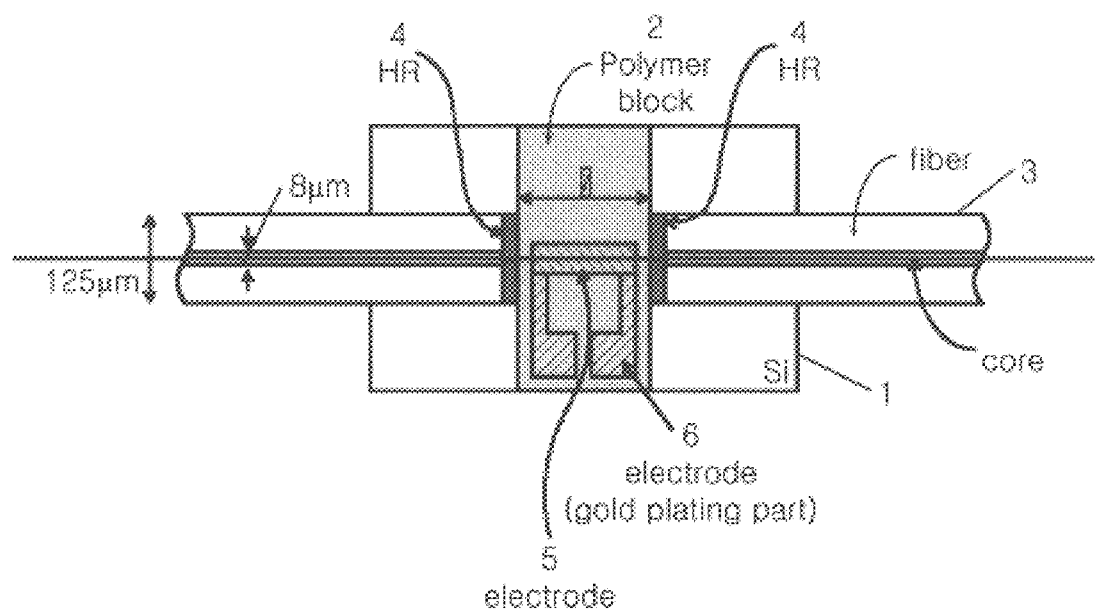

FIG. 3 shows a perspective view and a top planar view of a tunable Fabry-Perot using the thermo-optic effect of polymeric material in accordance with a second embodiment of the present invention.

As shown in FIG. 3, a pair of V-shaped grooves are formed at both ends of a silicon block 1, respectively. Two optical fibers 3 each being coated with a high-reflective thin film 4 at an end thereof are deposited and aligned on the V-shaped grooves, respectively, in such a manner that the high-reflective thin films 4 face each other. A thin-film resonant cavity medium 2 is made of polymeric material which is formed into a multi-layered thin film on the silicon between the two V-shaped grooves by using spin coating. A thermal electrode is formed on the thin-film medium 2, which includes a thin film gold-coated electrode 6 for supplying electric power to the thermal electrode and a thick film pad 5 formed through the electroplating.

Embodiment 3

Figure 4:
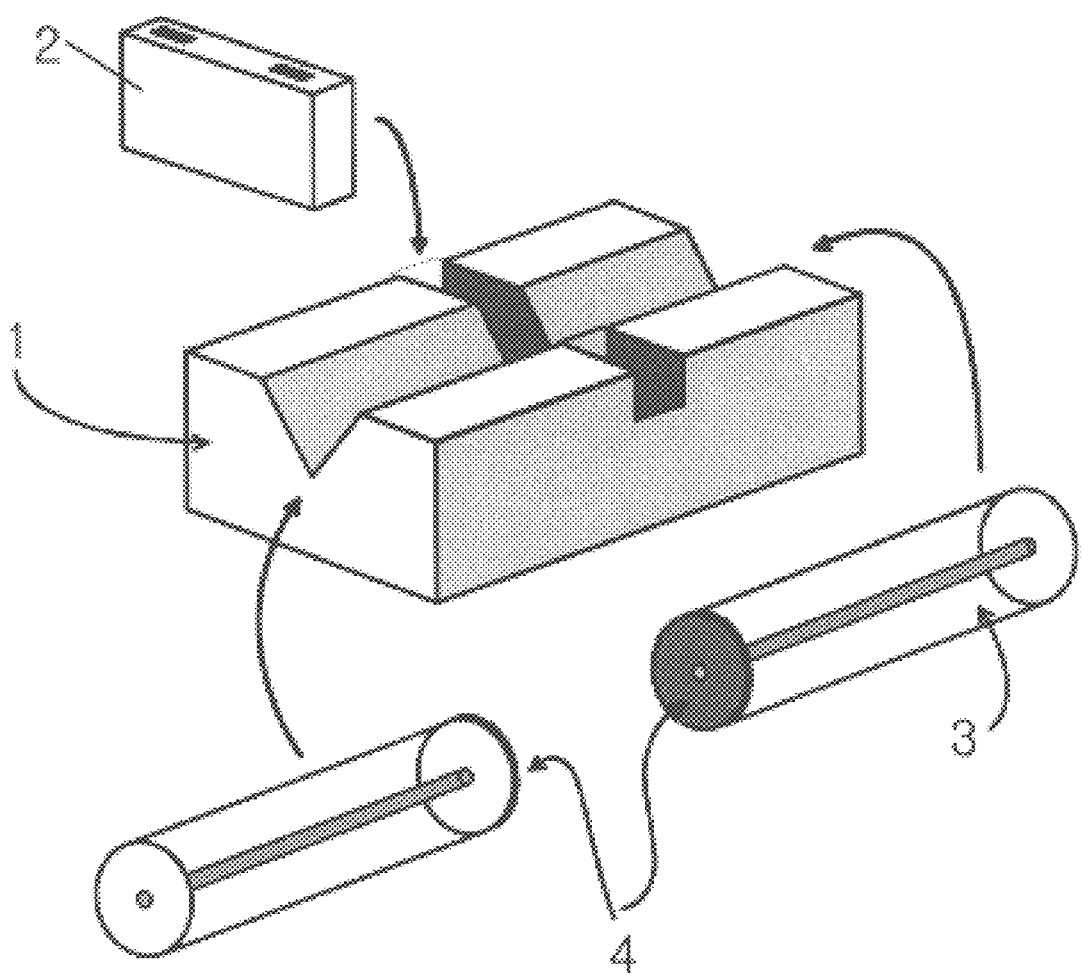
FIG. 4 depicts a perspective view of a tunable Fabry-Perot using the thermo-optic effect of polymeric material in accordance with a third embodiment of the present invention.

FIG. 4 shows a perspective view of a tunable Fabry-Perot using the thermo-optic effect of polymeric material in accordance with a third embodiment of the present invention.

As shown in FIG. 4, a silicon block 1 has a pair of V-shaped grooves formed at both ends thereof, respectively, and a groove into which, for example, a thin segment can be inserted. Two optical fibers 3 each being coated with a high-reflective thin film 4 at its one end are prepared. Further, a thin-film resonant cavity medium 2 having a thermal electrode formed thereon is prepared. The two optical fibers 3 are deposited on the V-shaped grooves of the silicon block 1, respectively, with the thin-film medium 2 being inserted into the groove, thereby completing the filter. On the other hand, the thin-film medium 2 is made in such a manner that first, laminated thin films of polymeric material and the thermal electrode are formed on the substrate by, e.g., the spin coating and then are separated from the substrate to be cut.

Embodiment 4

Figure 5:
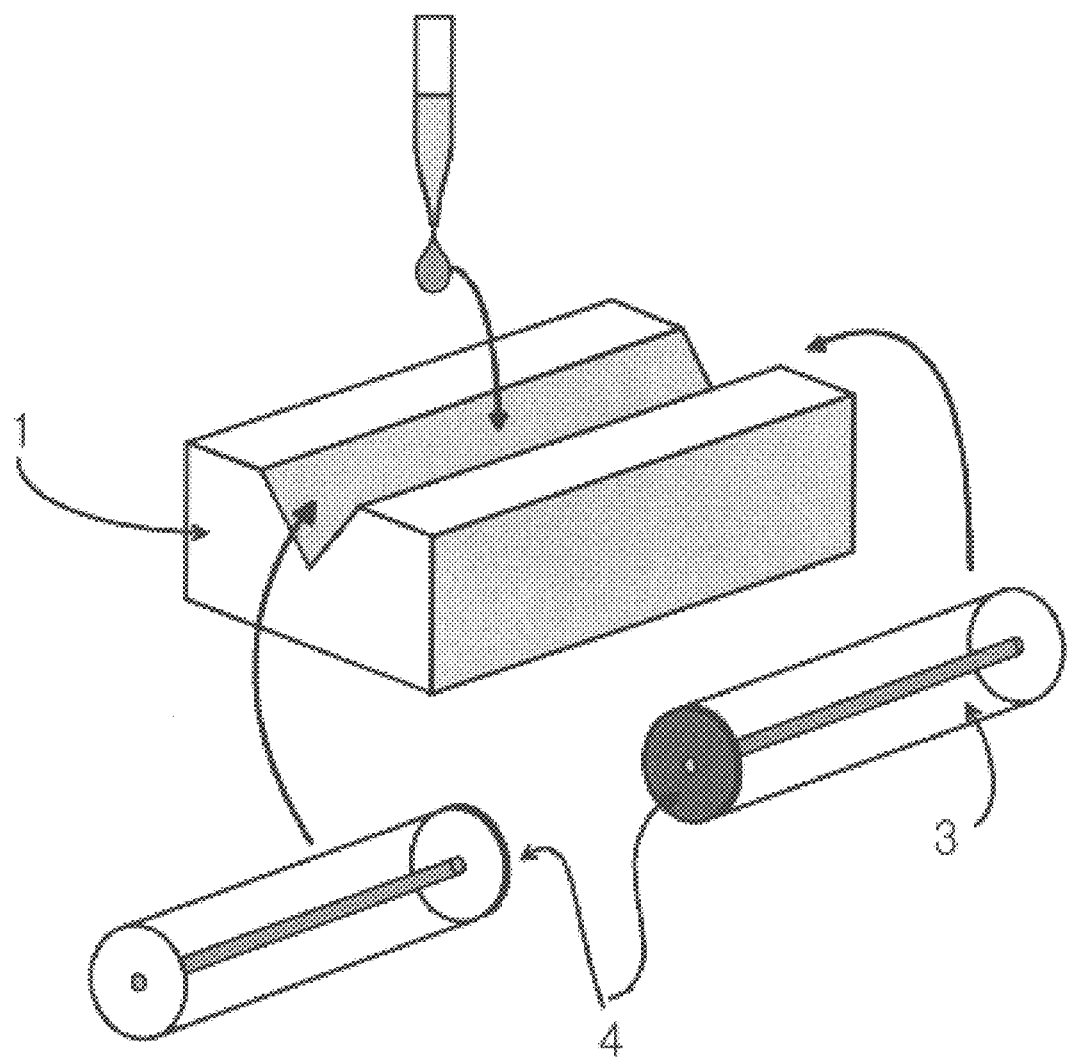
FIG. 5 presents a perspective view of a tunable Fabry-Perot using the thermo-optic effect of polymeric material in accordance with a fourth embodiment of the present invention.

FIG. 5 shows a perspective view of a tunable Fabry-Perot using the thermo-optic effect of polymeric material in accordance with a fourth embodiment of the present invention.

As shown in FIG. 5, a silicon block 1 has a straight V-shaped groove formed thereon. Two optical fibers 3 each being coated with high-reflective thin films 4 at its one end are prepared. The two optical fibers 3 are inserted into the V-shaped groove with a separation therebetween. Next, polymeric material in liquid state is poured into space of the V-shaped groove between the high-reflective thin films 4, and then cured in order to make a resonant cavity medium. Next, a thermal electrode is formed on the medium after a planarization of an upper portion of the medium to finish the manufacture of the filter. In this embodiment, undesirable dependency on the polarized light occurring in the polymer thin-film may be avoided.

The inventive method for fabricating tunable Fabry-Perot filter may easily and exactly manufacture a Fabry-Perot filter tunable within a widened range using a great level of thermo-optic effect of the material and technique of making the V-shaped groove. In the inventive filter, the optical fibers may be easily aligned with each other since the V-shaped groove is used. The inventive tunable Fabry-Perot filter may be used to select particular wavelength for the channel or to watch or monitor the channel in dense WDM optical communication network.

Although the invention has been shown and described with respect to the preferred embodiments, it will be understood by those skilled in the art that various changes and modifications may be made without departing from the spirit and scope of the invention as defined in the following claims.

What is claimed is:

1. A tunable Fabry-Perot filter comprising:
   two optical fibers each being coated with a high-reflective thin film at its one end;
   a means for aligning the two optical fibers with each other having a pair of V-shaped grooves formed at both ends thereof, respectively;
   a resonant cavity medium means of silicon or polymeric material having a high coefficient of thermo-optic effect; and
   a thermal electrode for applying heat to the resonant cavity medium means.

2. The tunable Fabry-Perot filter as recited in claim 1, wherein said high-reflective thin film is of dielectric multi-layered thin films in which a plurality of thin films are coated into the multi-layered form.

3. A tunable Fabry-Perot filter using a thermo-optic effect of silicon comprising:
   a silicon block having two V-shaped grooves formed at both ends, respectively;
   two optical fibers each being coated with a high-reflective thin film at its one end, the two optical fibers being arranged on the V-shaped grooves, respectively, with the high-reflective thin films facing each other, thereby being aligned with each other;
   a thermal electrode formed to apply heat to the thin film medium; and
   a thin-film resonant cavity medium made of the polymeric material formed on the silicon block between the V-shaped grooves.

4. The tunable Fabry-Perot filter as recited in claim 3, wherein said high-reflective thin film is of dielectric multi-layered thin films in which a plurality of thin films are coated into the multi-layered form.

5. A tunable Fabry-Perot filter using a thermo-optic effect of polymeric material comprising:
   a silicon block having a V-shaped groove extending between both ends;
   two optical fibers each being coated with a high-reflective thin film at its one end, the two optical fibers being arranged on the V-shaped groove with a predetermined magnitude of separation there between, in such a manner that the high-reflective thin films face each other, to be aligned with each other;
   a thin-film resonant cavity medium made of the polymeric material formed on the V-shaped groove between the high-reflective thin films; and
   a thermal electrode formed to apply heat to the thin film medium.

6. The tunable Fabry-Perot filter as recited in claim 5, wherein said high-reflective thin film is of dielectric multi-layered thin films in which a plurality of thin films are coated into the multi-layered form.

7. A method for fabricating a tunable Fabry-Perot filter, the method comprising the steps of:
   a) preparing a silicon block having a V-shaped groove extending between both ends;
   b) preparing two optical fibers each being coated with a high-reflective thin film at its one end;
   c) aligning the two optical fibers by inserting the two optical fibers into the V-shaped groove, with a predetermined magnitude of separation therebetween, while the high-reflective thin films facing each other;
   d) forming a thin-film resonant cavity medium with polymeric material on the V-shaped groove by pouring the polymeric material into the V-shaped groove between the high-reflective thin films; and
   e) fabricating a thermal electrode on the thin film medium after a planarization of an upper portion of the polymeric material.

* * * * *